United States Patent
Green et al.

(10) Patent No.: US 10,436,025 B2
(45) Date of Patent: Oct. 8, 2019

(54) DIAMOND HIGH TEMPERATURE SHEAR VALVE DESIGNED TO BE USED IN EXTREME THERMAL ENVIRONMENTS

(71) Applicants: Ryan Damont Green, League City, TX (US); Thomas Kruspe, Wietzendorf (DE)

(72) Inventors: Ryan Damont Green, League City, TX (US); Thomas Kruspe, Wietzendorf (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/365,998

(22) Filed: Mar. 27, 2019

(65) Prior Publication Data
US 2019/0218909 A1    Jul. 18, 2019

Related U.S. Application Data (63) Continuation-in-part of application No. 15/067,261, filed on Mar. 11, 2016, now Pat. No. 10,253,623.

(51) Int. Cl.
*E21B 47/18*    (2012.01)
*E21B 34/06*    (2006.01)
(Continued)

(52) U.S. Cl.
CPC .......... *E21B 47/185* (2013.01); *E21B 34/066* (2013.01); *F16K 11/0716* (2013.01);
(Continued)

(58) Field of Classification Search
CPC ....... E21B 47/18; E21B 47/185; E21B 34/066
See application file for complete search history.

(56) References Cited

U.S. PATENT DOCUMENTS

| | | |
|---|---|---|
| 2,278,532 A | 4/1942 | Crickmer |
| 3,065,416 A | 11/1962 | Jeter |

(Continued)

FOREIGN PATENT DOCUMENTS

| | | |
|---|---|---|
| EP | 0088402 A2 | 9/1983 |
| JP | 2003097756 A | 4/2003 |

(Continued)

OTHER PUBLICATIONS

Notification of Transmittal of the International Search Report and the Written Opinion of the International Searching Authority PCT/US2017/021329; dated May 10, 2017; 12 pages.

(Continued)

*Primary Examiner* — Kristyn A Hall
(74) *Attorney, Agent, or Firm* — Cantor Colburn LLP (57) ABSTRACT

A control valve assembly for a downhole wellbore including a body formed partially from a magnetic material. A plunger is moveably mounted in the body. A portion of the plunger is formed from a magnetic material. A magnetic circuit having a gap is arranged within the control valve assembly. The portion of the body formed from a magnetic material defines a first portion of the magnetic circuit and the portion of the plunger formed from magnetic material forms another portion of the magnetic circuit. A solenoid is mounted at the body and is selectively activated to create a magnetic field across the gap in the magnetic circuit causing the plunger to move thereby narrowing the gap to produce a pressure pulse in the wellbore.

22 Claims, 4 Drawing Sheets

(51) Int. Cl.
  *F16K 31/06* (2006.01)
  *F16K 27/04* (2006.01)
  *F16K 11/07* (2006.01)
  *F16K 25/00* (2006.01)

(52) U.S. Cl.
  CPC .......... *F16K 25/005* (2013.01); *F16K 27/048* (2013.01); *F16K 31/0613* (2013.01)

(56) References Cited

U.S. PATENT DOCUMENTS

| | | |
|---|---|---|
| 3,523,676 A | 8/1970 | Barker |
| 3,958,217 A | 5/1976 | Spinnler |
| 3,964,556 A | 6/1976 | Gearhart |
| 4,078,620 A | 5/1978 | Westlake |
| 4,336,564 A | 6/1982 | Wisniewski et al. |
| 4,351,037 A | 9/1982 | Scherbatskoy |
| 4,386,422 A | 5/1983 | Mumby |
| 4,515,225 A | 5/1985 | Dailey |
| 4,550,392 A | 10/1985 | Mumby |
| 4,628,495 A | 12/1986 | Peppers |
| 4,719,979 A | 1/1988 | Jones |
| 4,819,745 A | 4/1989 | Walter |
| 4,825,421 A | 4/1989 | Jeter |
| 4,873,488 A | 10/1989 | Barber et al. |
| 5,070,595 A | 12/1991 | Perkins et al. |
| 5,073,877 A | 12/1991 | Jeter |
| 5,103,430 A | 4/1992 | Jeter et al. |
| 5,182,731 A | 1/1993 | Hoelscher |
| 5,275,337 A | 1/1994 | Kolarik et al. |
| 5,303,776 A | 4/1994 | Ryan |
| 5,333,686 A | 8/1994 | Vaughan |
| 5,660,238 A | 8/1997 | Earl |
| 6,002,643 A | 12/1999 | Tchakarov |
| 6,016,288 A | 1/2000 | Frith |
| 6,199,823 B1 | 3/2001 | Dahlgren et al. |
| 6,328,112 B1 | 12/2001 | Malone |
| 6,464,011 B2 | 10/2002 | Tubel |
| 6,555,926 B2 | 4/2003 | Gondron |
| 6,626,244 B2 | 9/2003 | Powers |
| 6,714,138 B1 | 3/2004 | Turner |
| 6,811,135 B2 | 11/2004 | Moreno et al. |
| 6,898,150 B2 | 5/2005 | Hahn |
| 7,350,588 B2 | 4/2008 | Abercrombie Simpson et al. |
| 7,921,876 B2 | 4/2011 | Wright et al. |
| 8,365,821 B2 | 2/2013 | Hall et al. |
| 8,469,104 B2 | 6/2013 | Downton |
| 8,534,381 B1 | 9/2013 | Rinald |
| 8,627,883 B2 | 1/2014 | Richards |
| 8,640,768 B2 | 2/2014 | Hall et al. |
| 8,672,025 B2 | 3/2014 | Wolf et al. |
| 8,905,075 B2 | 12/2014 | Tower |
| 8,912,915 B2 | 12/2014 | Hay et al. |
| 2002/0117644 A1 | 8/2002 | Carrillo et al. |
| 2003/0024706 A1 | 2/2003 | Allamon |
| 2003/0047317 A1 | 3/2003 | Powers |
| 2004/0069530 A1 | 4/2004 | Prain |
| 2007/0056771 A1 | 3/2007 | Gopalan et al. |
| 2008/0236841 A1 | 10/2008 | Howlett et al. |
| 2008/0236842 A1 | 10/2008 | Bhavsar et al. |
| 2009/0114396 A1 | 5/2009 | Kusko et al. |
| 2010/0089587 A1 | 4/2010 | Stout |
| 2010/0102264 A1 | 4/2010 | Bickoff et al. |
| 2010/0195442 A1 | 8/2010 | Reyes et al. |
| 2011/0155392 A1 | 6/2011 | Frazier |
| 2011/0232791 A1 | 9/2011 | Bengea et al. |
| 2011/0278017 A1 | 11/2011 | Themig et al. |
| 2012/0118582 A1 | 5/2012 | Soni et al. |
| 2012/0261603 A1 | 10/2012 | Kahn et al. |
| 2012/0279723 A1 | 11/2012 | Hofman |
| 2014/0034325 A1 | 2/2014 | Jancha et al. |
| 2014/0284112 A1 | 9/2014 | Cenac et al. |
| 2014/0332277 A1 | 11/2014 | Churchill |
| 2015/0034386 A1 | 2/2015 | Reed et al. |
| 2015/0260014 A1 | 9/2015 | Zimmerman |
| 2015/0322753 A1 | 11/2015 | Zimmerman, Jr. |
| 2016/0265350 A1 | 9/2016 | Brown-Kerr et al. |
| 2016/0341001 A1 | 11/2016 | Scholz et al. |
| 2017/0260831 A1 | 9/2017 | Green |
| 2017/0260832 A1 | 9/2017 | Green et al. |
| 2017/0260852 A1 | 9/2017 | Green et al. |

FOREIGN PATENT DOCUMENTS

| | | |
|---|---|---|
| WO | 2014094150 A1 | 6/2014 |
| WO | 2015017522 A1 | 2/2015 |

OTHER PUBLICATIONS

Notification of Transmittal of the International Search Report and the Written Opinion of the International Searching Authority, or the Declaration; PCT/US2017/021327; dated May 10, 2017; 15 pages.
Notification of Transmittal of the International Search Report and the Written Opinion of the International Searching Authority, or the Declaration; PCT/US2017/021331; dated May 31, 2017; 13 pages.
Schlumberger, "High Temperature Drilling Operations", Retrieved from: https://www.slb.com/~/media/Files/drilling/brochures/drilling_applications/ht_tools_br.pdf; "An Industry Challenge" In 1-9: High temperatures can cause severe damage. . . .

DIAMOND HIGH TEMPERATURE SHEAR VALVE DESIGNED TO BE USED IN EXTREME THERMAL ENVIRONMENTS

CROSS REFERENCE TO RELATED APPLICATIONS

This application claims the benefit of an earlier filing date from U.S. Non-Provisional application Ser. No. 15/067,261 filed Mar. 11, 2016, the entire disclosure of which is incorporated herein by reference.

BACKGROUND

Downhole operations often include a downhole string that extends from an uphole system into a formation. The uphole system may include a platform, pumps, and other systems that support resource exploration, development, and extraction. In some instances, fluids may be passed from the uphole system into the formation through the downhole string. In other instances, fluid may pass from the formation through the downhole string to the uphole system. The downhole string may include various sensors that detect downhole parameters including formation parameters and parameters associated with the downhole string.

It is desirable to communicate information from downhole sensors to the uphole system. Communication may take place through wired, optical, or acoustical systems. Acoustical systems rely upon passage of pressure pulses generated downhole to an uphole receiver. The pressure pulses are created by a mud pulser by moving a piston into a choke valve in order to create an additional temporary pressure increase at the pump system on the surface. The generated pressure pulse travels with sound speed to the surface. The uphole receiver converts the pressure pulses to data indicative of sensed parameters. The pressure pulses provide useful information to uphole operators. Therefore, advances in downhole communication systems would be well received by resource exploration and recovery companies.

During drilling, a typical mud pulser substantially continuously generates pressure pulses over long time periods, often several days. In addition, a number of wellbores are currently drilled in formations having temperatures that are above 300° F. (149° C.). A majority of currently utilized mud pulsers include oil fillings, elastomers and/or electrical high pressure connectors, all of which tend to deteriorate over time and thus are not suitable for use in high temperature environments. The disclosure herein provides pulsers that are suitable for high temperature environments while also being made without oil fillings, elastomers or electrical high pressure connectors.

SUMMARY

Disclosed is a control valve assembly for a downhole wellbore including a body having a first fluid passage defining a fluid inlet and a second fluid passage defining a fluid outlet. The body is formed partially from a magnetic material. A plunger is moveably mounted within the body. The plunger includes a third fluid passage including a plunger fluid inlet and a plunger fluid outlet. The plunger fluid outlet is configured to selectively align and misalign with the second fluid passage. A portion of the plunger is formed from a magnetic material. A magnetic circuit having a gap is arranged within the control valve assembly. The portion of the body formed from a magnetic material defines a first portion of the magnetic circuit and the portion of the plunger formed from magnetic material forms another portion of the magnetic circuit. A solenoid is mounted at the body about at least a part of the magnetic material in at least one of the body and the plunger. The solenoid is selectively activated to create a magnetic field across the gap in the magnetic circuit. The magnetic field causes the plunger to move thereby narrowing the gap to produce a pressure pulse in the wellbore.

Also disclosed is a resource exploration system including an uphole system and a downhole system including a downhole tool in a wellbore operatively connected to the uphole system. The downhole tool includes a pulser having a control valve assembly including a body having a first fluid passage defining a fluid inlet and a second fluid passage defining a fluid outlet. The body is formed partially from a magnetic material. A plunger is moveably mounted within the body. The plunger includes a third fluid passage including a plunger fluid inlet and a plunger fluid outlet. The plunger fluid outlet is configured to selectively align and misalign with the second fluid passage. A portion of the plunger is formed from a magnetic material. A magnetic circuit having a gap arranged within the control valve assembly. The portion of the body formed from a magnetic material defines a first portion of the magnetic circuit and the portion of the plunger formed from magnetic material forms another portion of the magnetic circuit. A solenoid is mounted at the body about at least a part of the magnetic material in at least one of the body and the plunger. The solenoid is selectively activated to create a magnetic field across the gap in the magnetic circuit. The magnetic field causes the plunger to move thereby narrowing the gap to produce a pressure pulse in the wellbore.

BRIEF DESCRIPTION OF THE DRAWINGS

Referring now to the drawings wherein like elements are numbered alike in the several Figures.

DETAILED DESCRIPTION

Figure 1:
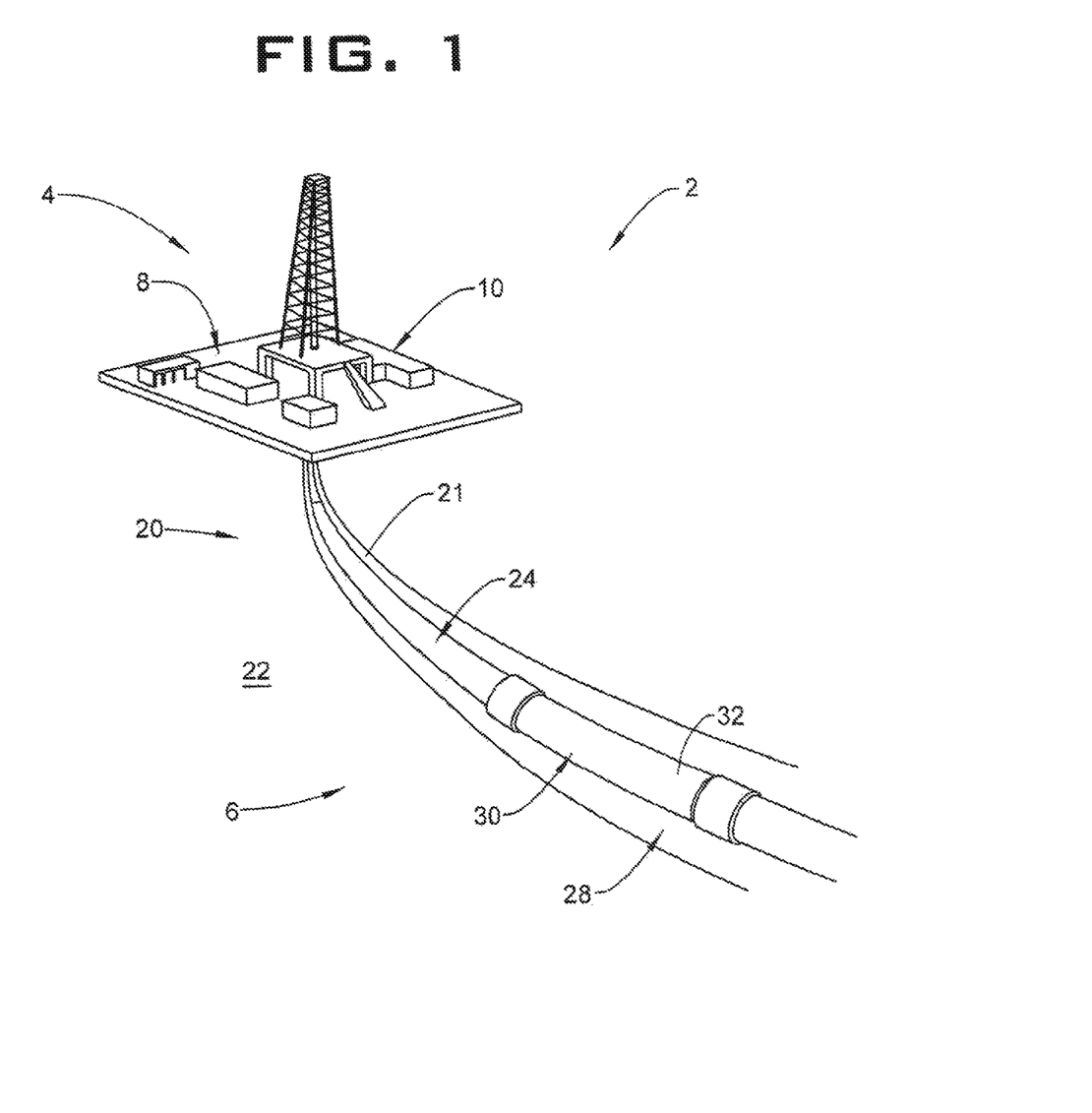
FIG. 1 depicts a resource exploration system having an uphole system operatively connected to a downhole string including a pulser alternator generator (PAG) having a plunger-type control valve assembly, in accordance with an exemplary embodiment.

A resource exploration system, in accordance with an exemplary embodiment, is indicated generally at 2, in FIG. 1. Resource exploration system 2 should be understood to include well drilling operations, resource extraction and recovery, $CO_2$ sequestration, and the like. Resource exploration and recovery system 2 may include an uphole system 4 operatively connected to a downhole system 6. Uphole system 4 may include pumps 8 that aid in completion and/or extraction processes as well as fluid storage 10. Fluid storage 10 may contain a gravel pack fluid or slurry (not shown) that is introduced into downhole system 6.

Downhole system 6 may include a downhole string 20 that is extended into a wellbore 21 formed in formation 22. Downhole string 20 may include a number of connected downhole tools or tubulars 24. One of tubulars 24 may include a pulser alternator generator (PAG) assembly 28. PAG assembly 28 may receive signals from one or more sensors (not shown) indicating one or more of formation parameters, downhole fluid parameters, tool condition parameters and the like. PAG assembly 28 creates one or more pressure pulses that are received at uphole system 4. The one or more pressure pulses define a code that may contain information regarding data received by the sensors. In accordance with an exemplary embodiment, PAG assembly 28 creates pressure pulses by selectively stopping a flow of pressurized downhole fluid or mud as will be detailed more fully below.

Figure 2:
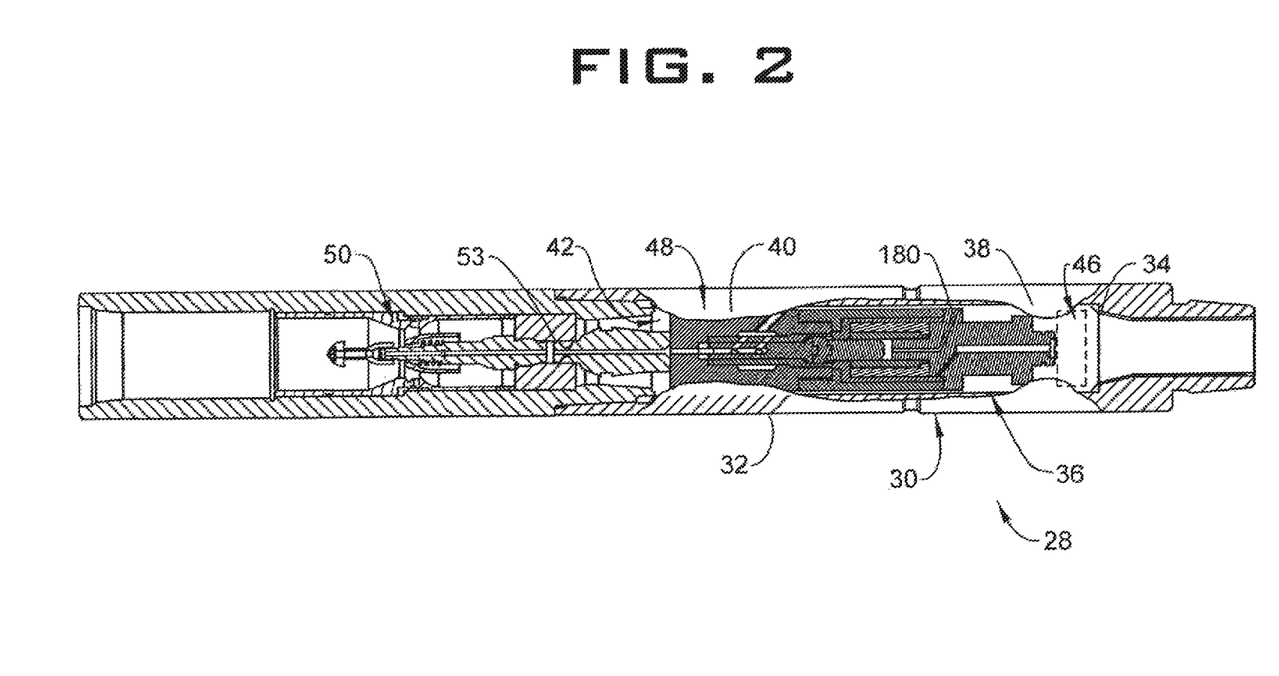
FIG. 2 depicts a partial cross-sectional view of the PAG of FIG. 1.

In accordance with an exemplary embodiment illustrated in FIG. 2, PAG assembly 28 includes a body portion 30 having an outer surface portion 32 and an inner portion 34. An inner housing 36 is arranged within inner portion 34. Inner housing 36 includes an outer surface 38 and an inner surface 40 that defines an interior portion 42. Interior portion 42 houses an alternator assembly 46, a control valve assembly (CVA) 48, and a main valve assembly (50) having a mud flow inlet portion (not separately labeled) and a mud flow outlet portion (also not separately labeled). As will be detailed more fully below, alternator assembly 46 provides signals to CVA 48 that allow drilling mud to flow through MVA 50 and creates pressure pulses in the mud flow according to the signals. CVA 48 creates pressure pulses in the mud flow that provide downhole data from sensors (not shown) operatively coupled to alternator assembly 46 to uphole operators.

Figure 3:
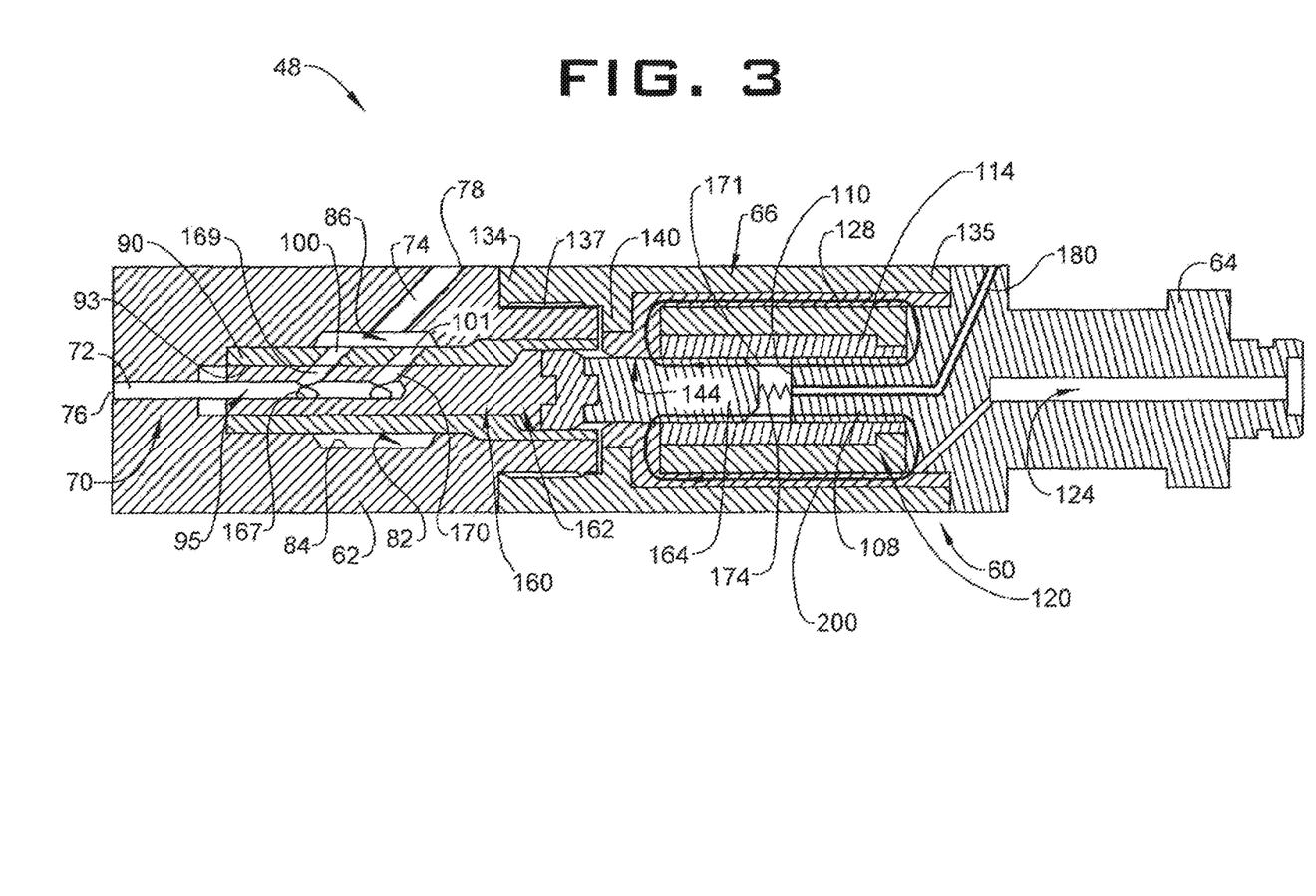
FIG. 3 depicts a partial cross-sectional view of the plunger-type control valve assembly in a first or open position.
Figure 4:
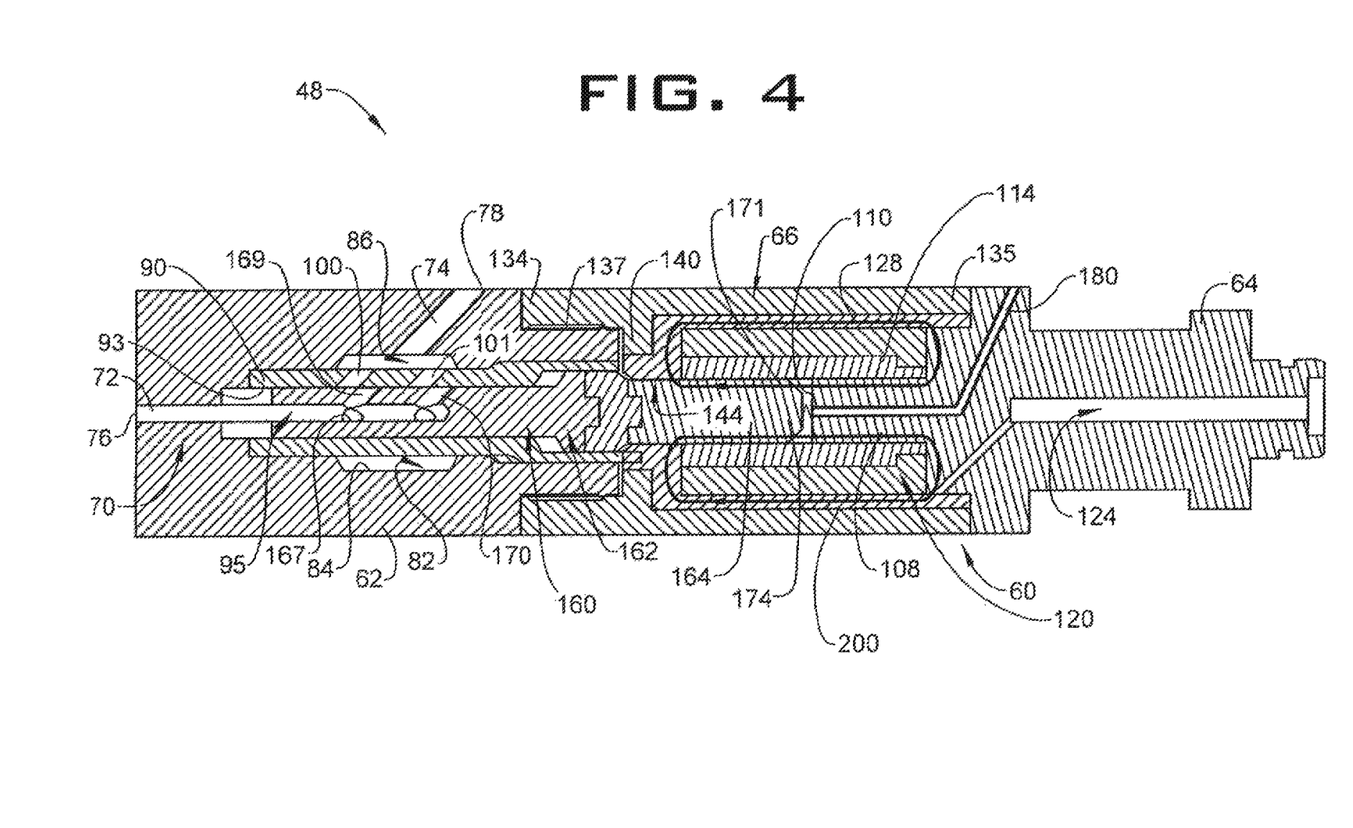
FIG. 4 depicts a partial cross-sectional view of the plunger-type control valve assembly in a second or closed position.

As shown in FIGS. 3 and 4, CVA 48 includes a body 60 having a first body portion 62 and a second body portion 64 joined by a sleeve member 66. Second body portion 64 may be formed from a corrosion resistant magnetic material such as a soft magnetic material e.g., Vacoflux® 9CR from Vacuumschmelze GmbH and Co. Magnetic and soft-magnetic materials are defined as having a magnetic permeability μ greater than about $1.26*10^{-4}$ N/A$^2$ (ferromagnetic or ferrimagnetic material). First body portion 62 includes a mud flow or fluid passage 70 having a first passage portion 72 and a second passage portion 74. At this point, it should be understood that the term magnetic material comprises any suitable material that may form part of a magnetic circuit including soft magnetic material.

First passage portion 72 defines a mud flow inlet 76 that receives a flow of mud from MVA 50 and second passage portion 74 defines a mud flow outlet 78. The number and location of second passage portions may vary. Correspondingly, the number and location of mud flow outlets may vary. First body portion 62 also includes a central passage 82 having an increased diameter portion 84 that defines a mud flow outlet chamber 86. A mud flow or fluid sleeve 90 is arranged in central passage 82. Mud flow sleeve 90 includes an outer surface (not separately labeled) and an inner surface 93 that defines a channel 95. Mud flow sleeve 90 includes, a plunger fluid inlet (not separately labeled) and a third passage portion 100 and a fourth passage portion 101, third and fourth passage portions 100 and 101 may take the form of a first plunger fluid outlet and second plunger fluid outlet respectively. Third and fourth passage portion 100 and 101 fluidically connect first passage portion 72 with second passage portion 74. The number and location of passage portions extending through mud flow sleeve 90 may vary.

Second body portion 64 may also be formed from soft magnetic material and includes a solenoid support 108 having an axial end 110. A solenoid carrier 114 is supported on solenoid support 108. Solenoid carrier 114 may be formed from high-strength, non-magnetic material such as Inconel and provides support for a solenoid 120. Solenoid 120 is operatively connected to alternator assembly 46 through a conductor (not shown) extending through a conductor passage 124 formed in second body portion 64. A housing 128, which may take the form of a pressure sleeve, is mounted in second body portion 64 about solenoid 120. Housing 128 may be formed from magnetic material and provides protection to solenoid 120 from downhole fluids passing through CVA 48 as well as from the high downhole pressure.

Housing 128 may be made from a magnetic material that is also corrosion resistant. In the embodiment of control valve 48, the solenoid 120 may be placed in a sealed and clean 1-bar environment. In the embodiment of the device 48 in FIGS. 3 and 4, plunger assembly 160 moves when the solenoid in the control valve 48 is energized. The plunger assembly also referred to as a plunger. While moving plunger assembly 160 slides in an environment that is flooded with fluid (mud). The presence of mud allows plunger assembly 160 to slide back and forth with relative low friction.

Sleeve member 66 includes a first end section 134 and a second end section 135. First end section 134 may include a plurality of threads 137 that engage first body portion 62. Second end section 135 may be mechanically linked to second body portion 64 through, for example, a press fit, a threaded connection, or a joining process such as welding. Sleeve member 66 includes an annular flange 140 extending radially inwardly from an inner surface (not separately labeled). Annular flange 140 together with housing 128 may define a plunger support 144. Sleeve member 66 may be formed from a high strength, non-magnetic material, such as steel or Inconel so as to withstand downhole fluids. Of course, it should be understood, that the particular materials employed for solenoid carrier 114, and sleeve member 66 may vary depending on desired operating parameters and downhole conditions.

In accordance with an aspect of an exemplary embodiment, CVA 48 includes a plunger assembly 160, also referred to as a plunger, including a valve portion 162 and an actuator shaft 164, also referred to as a drive portion of the plunger. Valve portion 162 is operatively connected with actuator shaft 164. Actuator shaft 164 may be formed from soft magnetic material. Valve portion 162 may be formed from hard abrasion resistant material such as Tungsten Carbide and may be provided with a diamond coating of may employ other processes to form a hardened outer surface. The use of hard abrasion resistant material allows valve portion 162 to withstand high pressure corrosive and abrasive downhole mud passing from MVA 50 at high downhole temperatures as will be discussed more fully below. Valve portion 162 includes a central chamber 167 fluidically connected with first passage portion 72. A fifth passage portion 169 and a sixth passage portion 170 extend through valve portion 162. A spring 174 biases plunger assembly 160 in a first position as shown in FIG. 3, wherein fifth and sixth passage portions 169 and 170 register with third and fourth passage portions 100 and 101 (control valve open position). Solenoid 120 is selectively activated to shift plunger assembly 160 to a second position (FIG. 4) wherein fifth and sixth passage portions 169 and 170 are off-set from third and fourth passage portions 100 and 101 (control valve closed position). CVA 48 may also include a washout passage 180 that provides passage for particles to be guided out from a back side (not separately labeled) of actuator shaft 164. Plunger support 144 may be either incorporated into or abutting on housing 128. Plunger support 144 is formed from a magnetic material, e.g. a soft magnetic material, and is part of the magnetic circuit. Plunger support 144 slidingly supports plunger assembly 160 by slidingly supporting actuator shaft 164.

In accordance with an aspect of an exemplary embodiment, third and fourth passage portions 100, 101 and fifth and sixth passage portions 169,170 may extend at an angle of between about 20° and about 80° relative to a longitudinal axis (not separately labeled) of CVA 48. In accordance with another aspect, third and fourth passage portions 100, 101 and fifth and sixth passage portions 169,170 may extend at an angle of about 60° relative to the longitudinal axis. In this manner, shifting plunger assembly 160 between the first position and the second position shears mud flow passing from first passage portion 72 through valve portion 162 into mud flow outlet chamber 86. Further, with this arrangement, the amount of force necessary to shift plunger assembly 160 is reduced over that which would be needed if third, fourth, fifth and sixth passage portions 100, 101, 169, and 170 projected substantially perpendicularly relative to the longitudinal axis.

Further, second passage portion 74 may extend at an angle of between about 20° and about 80° relative to a longitudinal axis (not separately labeled) of CVA 48. In accordance with another aspect, second passage portion 74 may extend at an angle of about 60° relative to the longitudinal axis. The angle of second passage portion 74 reduces impact forces associated with pulses of mud passing from mud flow outlet 78 onto inner surface 40 may be reduced over those which would be realized if mud flow outlet 78 extended perpendicularly to the longitudinal axis.

In accordance with an aspect of an exemplary embodiment, alternator assembly 46 provides signals to selectively activate, e.g., energize through an application of electric energy, solenoid 120 creating a magnetic flux 200 in a magnetic circuit (not separately labeled) that flows through second body portion 64, actuator shaft 164, plunger supports 144, and housing 128. The magnetic circuit includes a gap 171 between actuator shaft 164 and axial end 110 of solenoid support 108. At this point, it should be understood that the term "magnetic circuit" defines a pathway of material within CVA 48 through which magnetic flux 200 will flow. Activating solenoid 120 causes a magnetic field (not separately labeled) across the gap 171. The magnetic field creates a magnetic force that acts across gap 171 causing plunger assembly 160 to move toward second body portion 64. More specifically actuator shaft 164 moves toward solenoid support 108 thereby shifting plunger assembly 160 from the first position (FIG. 3) to the second position (FIG. 4). Plunger assembly 160 moves along a longitudinal axis of the body towards solenoid support 108 narrowing gap 171. Gap 171 need not fully close in order to close the control valve.

Solenoid 120 may then be de-activated opening (interrupting) the magnetic circuit cutting off magnetic flux 200 allowing spring 174 to bias plunger assembly 160 back to the first position, opening the control valve. In the first position the width of gap 171 is larger than the width of gap 171 in the second position. The first position is also referred to as a gap open position, the second position is also referred to as a gap closed position. The gap closed position does not require that the gap to be fully closed. In the first position, mud may flow from MVA 50, through plunger assembly 160, into mud flow outlet chamber 86 and be expelled from mud flow outlets 78. When CVA 48 is operated rapidly, MVA 50 creates mud pulses that travel through downhole string 20. An uphole receiver captures pressure waves created by the pulses of mud. The pressure pulses are presented in a pattern dictated by signals received from one or more sensors at alternator assembly 46. The pressure pulses may be decrypted to provide data regarding one or more downhole parameters to uphole operators.

Splitting the plunger assembly into at least two parts allows separating the valve portion from the magnetic circuit. Therefore, the valve portion 162 does not need to be made from magnetic material. The valve portion may be made from a material that is much better suited to withstand harsh downhole conditions, like high temperatures and corrosive and abrasive downhole fluids. The material of the valve portion of the plunger assembly may be high strength non-magnetic material, such as hardened steel, diamond, tungsten carbide, carbon nitride, or boron nitride or alternative hard and/or less corrosive material. The valve portion may as well be coated by a hard material, such a diamond coating.

Set forth below are some embodiments of the foregoing disclosure:

Embodiment 1

A control valve assembly for a downhole wellbore comprising: a body including a first fluid passage defining a fluid inlet and a second fluid passage defining a fluid outlet, wherein the body is formed partially from a magnetic material; a plunger moveably mounted within the body, the plunger including a third fluid passage including a plunger fluid inlet and a plunger fluid outlet, the plunger fluid outlet configured to selectively align and misalign with the second fluid passage, wherein a portion of the plunger is formed from a magnetic material; a magnetic circuit having a gap arranged within the control valve assembly, wherein the portion of the body formed from a magnetic material defines a first portion of the magnetic circuit and the portion of the plunger formed from magnetic material forms another portion of the magnetic circuit; and a solenoid mounted at the body about at least a part of the magnetic material in at least one of the body and the plunger, the solenoid being selectively activated to create a magnetic field across the gap in the magnetic circuit, the magnetic field causing the plunger to move thereby narrowing the gap to produce a pressure pulse in the wellbore.

Embodiment 2

The control valve assembly according to any previous embodiment, wherein the body includes a first body portion mechanically linked to a second body portion by a sleeve member, the first body portion including a central passage receptive of the plunger.

Embodiment 3

The control valve assembly according to any previous embodiment, further comprising: a fluid sleeve arranged in the central passage, the third fluid passage being formed in the fluid sleeve.

Embodiment 4

The control valve assembly according to any previous embodiment, wherein the first body portion includes a fourth fluid passage fluidically connected to the second fluid passage.

Embodiment 5

The control valve assembly according to any previous embodiment, wherein the central passage includes an increased diameter portion defining a fluid outlet chamber fluidically connected to the second fluid passage.

Embodiment 6

The control valve assembly according to any previous embodiment, wherein the portion of the plunger is formed from soft magnetic material.

Embodiment 7

The control valve assembly according to any previous embodiment, wherein the second body portion includes a solenoid support and a solenoid carrier mounted to the solenoid support, the solenoid being carried by the solenoid carrier.

Embodiment 8

The control valve assembly according to any previous embodiment, wherein the plunger includes an actuator shaft formed from soft magnetic material, the actuator shaft being movable towards the solenoid support when the solenoid is activated.

Embodiment 9

The control valve assembly according to any previous embodiment, further comprising: a spring acting upon the plunger arranged between the actuator shaft and the solenoid support.

Embodiment 10

The control valve assembly according to any previous embodiment, wherein the second fluid passage includes at least two second fluid passages and the third fluid passage includes at least two plunger fluid outlets.

Embodiment 11

The control valve assembly according to any previous embodiment, further comprising: a housing extending about the solenoid, the housing being formed from a soft magnetic material.

Embodiment 12

A resource exploration system comprising: an uphole system; and a downhole system including a downhole tool in a wellbore operatively connected to the uphole system, the downhole tool including a pulser having a control valve assembly comprising: a body including a first fluid passage defining a fluid inlet and a second fluid passage defining a fluid outlet, wherein the body is formed partially from a magnetic material; a plunger moveably mounted within the body, the plunger including a third fluid passage including a plunger fluid inlet and a plunger fluid outlet, the plunger fluid outlet configured to selectively align and misalign with the second fluid passage, wherein a portion of the plunger is formed from a magnetic material; a magnetic circuit having a gap arranged within the control valve assembly, wherein the portion of the body formed from a magnetic material defines a first portion of the magnetic circuit and the portion of the plunger formed from magnetic material forms another portion of the magnetic circuit; and a solenoid mounted at the body about at least a part of the magnetic material in at least one of the body and the plunger, the solenoid being selectively activated to create a magnetic field across the gap in the magnetic circuit, the magnetic field causing the plunger to move thereby narrowing the gap to produce a pressure pulse in the wellbore.

Embodiment 13

The resource exploration system according to any previous embodiment, wherein the body includes a first body portion mechanically linked to a second body portion by a sleeve member, the first body portion including a central passage receptive of the plunger.

Embodiment 14

The resource exploration system according to any previous embodiment, wherein the second fluid passage includes at least two second fluid passages and the third fluid passage includes at least two plunger fluid outlets.

Embodiment 15

The resource exploration system according to any previous embodiment, further comprising: a fluid sleeve arranged in the central passage, the third fluid passage being formed in the fluid sleeve.

Embodiment 16

The resource exploration system according to any previous embodiment, wherein the first body portion includes a fourth fluid passage fluidically connected to the second fluid passage.

Embodiment 17

The resource exploration system according to any previous embodiment, wherein the central passage includes an increased diameter portion defining a fluid outlet chamber fluidically connected to the second fluid passage.

Embodiment 18

The resource exploration system according to any previous embodiment, wherein the portion of the plunger is formed from a soft magnetic material.

Embodiment 19

The resource exploration system according to any previous embodiment, wherein the second body portion includes a solenoid support and a solenoid carrier mounted to the solenoid support, the solenoid being carried by the solenoid carrier.

Embodiment 20

The resource exploration system according to any previous embodiment, further comprising: a housing extending about the solenoid, the housing being formed from a soft magnetic material.

Embodiment 21

The resource exploration system according to any previous embodiment, wherein the plunger includes an actuator shaft formed from a soft magnetic material, the actuator shaft being moveable toward the solenoid support when the solenoid is activated.

Embodiment 22

The resource exploration system according to any previous embodiment, further comprising: a spring acting upon the plunger arranged between the actuator shaft and the solenoid support.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc.

The term "about" is intended to include the degree of error associated with measurement of the particular quantity based upon the equipment available at the time of filing the application. For example, "about" can include a range of ±8% or 5%, or 2% of a given value.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A control valve assembly for a downhole wellbore comprising:
   a body including a first fluid passage defining a fluid inlet and a second fluid passage defining a fluid outlet, wherein the body is formed partially from a magnetic material;
   a plunger moveably mounted within the body, the plunger including a third fluid passage including a plunger fluid inlet and a plunger fluid outlet, the plunger fluid outlet configured to selectively align and misalign with the second fluid passage, wherein a portion of the plunger is formed from a magnetic material;
   a magnetic circuit having a gap arranged within the control valve assembly, wherein the portion of the body formed from a magnetic material defines a first portion of the magnetic circuit and the portion of the plunger formed from magnetic material forms another portion of the magnetic circuit; and
   a solenoid mounted at the body about at least a part of the magnetic material in at least one of the body and the plunger, the solenoid being selectively activated to create a magnetic field across the gap in the magnetic circuit, the magnetic field causing the plunger to move thereby narrowing the gap to produce a pressure pulse in the wellbore.

2. The control valve assembly according to claim 1, wherein the body includes a first body portion mechanically linked to a second body portion by a sleeve member, the first body portion including a central passage receptive of the plunger.

3. The control valve assembly according to claim 2, further comprising: a fluid sleeve arranged in the central passage, the third fluid passage being formed in the fluid sleeve.

4. The control valve assembly according to claim 3, wherein the first body portion includes a fourth fluid passage fluidically connected to the second fluid passage.

5. The control valve assembly according to claim 3, wherein the central passage includes an increased diameter portion defining a fluid outlet chamber fluidically connected to the second fluid passage.

6. The control valve assembly according to claim 2, wherein the second body portion includes a solenoid support and a solenoid carrier mounted to the solenoid support, the solenoid being carried by the solenoid carrier.

7. The control valve assembly according to claim 6, wherein the plunger includes an actuator shaft formed from soft magnetic material, the actuator shaft being movable towards the solenoid support when the solenoid is activated.

8. The control valve assembly according to claim 7, further comprising: a spring acting upon the plunger arranged between the actuator shaft and the solenoid support.

9. The control valve assembly according to claim 1, wherein the portion of the plunger is formed from soft magnetic material.

10. The control valve assembly according to claim 1, wherein the second fluid passage includes at least two second fluid passages and the third fluid passage includes at least two plunger fluid outlets.

11. The control valve assembly according to claim 1, further comprising: a housing extending about the solenoid, the housing being formed from a soft magnetic material.

12. A resource exploration system comprising:
   an uphole system; and
   a downhole system including a downhole tool in a wellbore operatively connected to the uphole system, the downhole tool including a pulser having a control valve assembly comprising:
   a body including a first fluid passage defining a fluid inlet and a second fluid passage defining a fluid outlet, wherein the body is formed partially from a magnetic material;
   a plunger moveably mounted within the body, the plunger including a third fluid passage including a plunger fluid inlet and a plunger fluid outlet, the plunger fluid outlet configured to selectively align and misalign with the second fluid passage, wherein a portion of the plunger is formed from a magnetic material;
   a magnetic circuit having a gap arranged within the control valve assembly, wherein the portion of the body formed from a magnetic material defines a first portion of the magnetic circuit and the portion of the plunger formed from magnetic material forms another portion of the magnetic circuit; and
   a solenoid mounted at the body about at least a part of the magnetic material in at least one of the body and the plunger, the solenoid being selectively activated to create a magnetic field across the gap in the magnetic circuit, the magnetic field causing the plunger to move thereby narrowing the gap to produce a pressure pulse in the wellbore.

13. The resource exploration system according to claim 12, wherein the body includes a first body portion mechanically linked to a second body portion by a sleeve member, the first body portion including a central passage receptive of the plunger.

14. The resource exploration system according to claim 13, wherein the second fluid passage includes at least two second fluid passages and the third fluid passage includes at least two plunger fluid outlets.

15. The resource exploration system according to claim 13, further comprising: a fluid sleeve arranged in the central passage, the third fluid passage being formed in the fluid sleeve.

16. The resource exploration system according to claim 15, wherein the first body portion includes a fourth fluid passage fluidically connected to the second fluid passage.

17. The resource exploration system according to claim 15, wherein the central passage includes an increased diameter portion defining a fluid outlet chamber fluidically connected to the second fluid passage.

18. The resource exploration system according to claim 13, wherein the second body portion includes a solenoid support and a solenoid carrier mounted to the solenoid support, the solenoid being carried by the solenoid carrier.

19. The resource exploration system according to claim 18, wherein the plunger includes an actuator shaft formed from a soft magnetic material, the actuator shaft being moveable toward the solenoid support when the solenoid is activated.

20. The resource exploration system according to claim 19, further comprising: a spring acting upon the plunger arranged between the actuator shaft and the solenoid support.

21. The resource exploration system according to claim 12, wherein the portion of the plunger is formed from a soft magnetic material.

22. The resource exploration system according to claim 12, further comprising: a housing extending about the solenoid, the housing being formed from a soft magnetic material.

* * * * *